United States Patent Office 3,222,375
Patented Dec. 7, 1965

3,222,375
TRIAMINO-TRIAZOLES AND THEIR PRODUCTION
Fritz Wiloth, Klingenberg, and Erwin Sommer, Obernburg, Germany, assignors to Vereinigte Glanzstoff-Fabriken A.G., Wuppertal-Elberfeld, Germany
No Drawing. Filed July 11, 1962, Ser. No. 209,234
Claims priority, application Germany, July 19, 1961, V 21,021; Mar. 28, 1962, V 22,256
9 Claims. (Cl. 260—308)

This invention is directed to a process for the production of triamino-triazoles, and more particularly, the invention is concerned with the production of a class of novel compounds which can be more specifically designated as bis-3,5-(ω-amino-alkyl)-4-aminotriazoles. The triamino-triazole compounds produced according to this invention have a number of uses, particularly as raw materials or intermediates for making dyestuffs, pharmaceuticals and polymers of the type known as linear polyamides and polyesters. Since all of the compounds possess three amino substituents and a reterocyclic ring, the broad functional utility of these compounds in a number of different fields such as those indicated will be readily appreciated by one skilled in the art.

It is known that carboxylic acids, carboxylic acid esters, iminocarboxylic acid esters and nitriles can be reacted with hydrazine in order to form certain dihydrotetrazine compounds. Under certain conditions, the dihydrotetrazine intermediates can be rearranged into corresponding monoamino-triazole compounds. In general, most triazole compounds appear to require a method of production involving more than one step, i.e., the preparation of an intermediate cyclic compound followed by rearrangement or preparation of an open-chain intermediate followed by cyclization.

One object of the present invention is to provide a novel method for the production of certain triamino-triazoles in a single step from readily available and relatively inexpensive initial materials.

Another object of the invention is to provide a method of producing triamino-triazoles which can be carried out in a simple manner and which leads to a high yield of the desired product in very pure form. Thus, it is an object of the invention to avoid the formation and isolation of intermediate products and also to avoid by-products which would contaminate the directly obtained triamino-triazole.

It in a further object of the invention to provide novel polycondensates, such as polyamides and polyesters, wherein the triamino-triazoles of this invention have been incorporated as modifiers to improve the properties of the polycondensate product.

These and other objects and advantages of the invention will become more readily apparent upon consideration of the following detailed specification.

In accordance with the invention, it has now been surprisingly found that lactams can be reacted with hydrazine at a temperature between about 150° C. and 250° C., preferably from about 180° C. to 230° C., and in the presence of an inert gas in order to directly produce triamino-triazoles having the formula

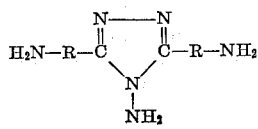

wherein R represents a member selected from the group consisting of —$C_nH_{2n}$— and

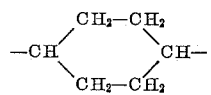

$n$ representing an integer of from 3 to 7, inclusive.

This reaction between the lactam and hydrazine is preferably carried out in a closed vessel, for example in a bomb tube or in an autoclave which may be enamelled or may be constructed of stainless steel with a glass lining. In this closed vessel, a reaction pressure will be reached which corresponds to the reaction temperature. In other words, it is unnecessary to work at a predetermined pressure, and it is most convenient to permit the pressure to be established by the temperature of the reaction mixture. Otherwise, the pressure can be regulated or be permitted to vary within a relatively broad range, for example from about 30 to 70 atmospheres.

In the triamino-triazole product, two molecules of lactam are combined with two molecules of hydrazine, and while the reaction can be carried out with equimolar amounts of each reactant, it is preferred to employ an excess of the hydrazine. It is also preferable to initially introduce the hydrazine into the reaction as hydrazine hydrate ($N_2H_4.H_2O$), although it will be understood that hydrazine itself is the essential reactant. Nitrogen or any other inert gas can be used as a protective medium for the reactants in the closed vessel. After the reaction has been completed, water and any excess hydrazine are readily removed, preferably by distillation under reduced pressure, and the triamino-triazole end product is precipitated with very good yields. The end product can then be purified by vacuum distillation or by extraction and recrystallization according to conventional purification procedures.

The lactams to be used in the reaction with hydrazine according to the invention can be defined as heterocyclic organic compounds containing the divalent group —NH.CO— in a cyclic ring which otherwise contains only carbon and hydrogen atoms. Such rings are generally formed by the elimination of water from a saturated aliphatic amino carboxylic acid. Those lactams are preferred which in addition to the —NH.CO— group contain from 3 to 7 carbon atoms in the cyclic structure. The following lactams are especially useful for the purposes of this invention: pyrrolidone; piperidone; caprolactam; enanthlactam; capryllactam; the C-lower alkyl-substituted lactams, e.g. as obtained by the cyclic condensation of gamma- or delta-amino carboxylic acids, such as C-methyl- or C-ethyl-caprolactam; and endolactams, such as hexahydro-p-amino-benzoic acid lactam. In general, it is preferred to produce a unitary product by employing a single lactam reactant, but a mixture of products can be obtained in which R of the above formula will vary depending upon the incorporation of different lactams as a mixture of initial reactants.

The production of triamon-triazoles by the method of this invention is further illustrated by the following examples, it being understood that these examples are merely representative and not intended to be exclusive.

*Example 1.—Production of bis-3,5-(ω-aminopropyl)-4-aminotriazole*: 17 g. of pyrrolidone are heated with 40 g.

of freshly distilled 100% hydrazine hydrate in a bomb tube under a nitrogen atmosphere for 6 hours at 210° C. After distilling off the excess hydrazine and water on a boiling water bath under reduced pressure, there remains a colorless, viscous oil, which is purified by vacuum distillation at 260–265° C. and 0.01 mm. Hg. The product is a colorless, water-soluble, crystalline mass with a melting point of 68–72° C. The yield is 75% of the theoretical amount.

*Example 2.—Production of bis-3,5-(ω-aminopentyl)-4-aminotriazole*: 22.6 g. of ε-caprolactam are heated with 40 g. of freshly distilled 100% hydraine hydrate in a bomb tube under a nitrogen atmosphere for 6 hours at 220° C. After distilling off the excess hydrazine and water on a boiling water bath under the reduced pressure of a water jet vacuum, there remains after cooling a colorless, crystalline mass. This mass is extracted for 12 hours with ether in a Soxhlet and is recrystallized from ethyl acetate which is employed in an amount of about 10–12 times the amount of the triazole product. The recrystallized product is obtained as colorless needles or flakes which are soluble in water and insoluble in ether, and which have a melting point of 89–91° C. The yield is 50% of the theoretical amount.

*Example 3.—Production of bis-3,5-(ω-aminopentyl)-4-aminotriazole.*—1130 g. of ε-caprolactam are heated with 2000 g. of freshly distilled 100% hydrazine hydrate in a 10-liter autoclave of stainless steel with a glass inset or lining for 6 hours under a nitrogen atmosphere at 210° C. The pressure rises during the process to 50–60 atmospheres. The triazole product is then isolated and purified as described in Example 2. The yield is 55% of the theoretical amount.

As in the three preceding examples, the remaining lactams recited above may be reacted in an identical manner with hydrazine in order to obtain the corresponding triaminotriazoles. These triamino-triazoles are particularly useful as modifiers for linear fiber-forming polycondensates commonly referred to as polyamides and polyesters. The N-amino group in the triamino-triazoles imparts improved dyeability to the polycondensate fiber, even when the modifier is present in the condensed chain only in very small amounts, without substantially changing the other desirable properties of the fiber, e.g., high melting points, pinnability and the like. When employed for this purpose, R in the above formula of the triamino-triazole compound can contain from 2 to 11 carbon atoms in a linear or branched alkylene chain, but 3 to 7 carbon atoms are still preferred in view of the greater availability of the initial reactants and the relative ease of making such compounds.

In order to modify the polyamide or polyester, the polycondensate or linear polymer is prepared in the usual manner and the triamino-triazole is added to the monomeric or precondensate reactants or to the molten polycondensate. The triamino-triazole additve s thereby incorporated into the polymer molecule or is attached at the end of the molecule chain. After spinning and drawing fibers, the modified polyamide or polyester has an improved affinity for dyestuffs without losing other valuable properties with respect to use as a textile material.

The above-mentioned triamino-triazole modifiers may be used as free amines or also as salts of a dicarboxylic acid or an inorganic acid. Since the $NH_2$ group, which is attached to the nitrogen atom, i.e., the amino group nuclearly-substituted in 4-position, has a relatively low basicity, it does not react on mild acylation. Therefore, it is also possible to produce precondensates by condensation of the triamino-triazoles with dicarboxylic acids, their esters or acid chlorides, and to add these precondensates as the modifier to the polyamide or polyester at a suitable phase of the condensation reaction or n subsequent manufacture or further processing. Polyamides and polyesters are not previously known which contain in the molecule chain the structural element

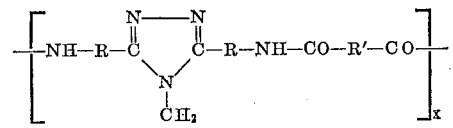

(in which R' stands for an aliphatic or aromatic hydrocarbon radical, e.g. hexamethylene or para-phenyl, which may be further substituted in known manner, and X signifies the degree of polymerization—in mixed polyamides or polyesters, X=1 is also possible). This structural element is the carrier of the special properties of the polyamides and polyesters according to the invention.

Although the triamino-triazole compounds are generally useful with all synthetic fiber-forming polyamides and polyesters, it will be recognized that it is particularly desirable to modify commercial polyamides such as polycaprolactam and polyhexamethylenediamine-adipate (nylon) or polyesters such as polyethylene-terephthalate (Dacron). These and similar polycondensates, as well as the monomers from which they are produced, are adequately described in the literature directed to synthetic fibers.

In the production of a modified nylon, it is most convenient to add the triamino-triazole as the salt of adipic acid to the usual monomeric hexamethylenediamine-adipate, sometimes referred to as the "AH-salt." However, the triamino-triazole may also be added when forming the AH-salt or can be added as the adipate prior to or during condensation of the AH-salt.

In the production of a modified polyamide of caprolactam, the triamino-triazole can likewise be added as the salt of adipic acid, or it can be added as a reaction product with adipic acid dichloride or with oxalic acid diesters before or during the polycondensation.

Also, when modifying polyesters such as polyethylene terephthalate, it is possible to react the triamino-triazole with the monomeric acid component prior to condensation. For example, the salt of the triamino-triazole and the acid component of the polyester or another suitable dicarboxylic acid, or the reaction product of the triamino-triazole with acid chlorides or acid esters can be produced and then added to the reaction charge before or during the polycondensation or even only during further processing.

The additives represented by the triamino-triazole compounds are contained in the modified polycondensates in amounts of about 0.1 to 10 molar percent, preferably from 0.5 to 2 molar percent. If precondensates or salts are used, then the same quantitative data should be observed by reference to monomeric units.

Thus, the term "molar percent" is employed herein as defined by the formula: $100T/M$ where T is the number of mols of the triamino-triazole monomeric unit and M is the total number of mols of all monomeric units. Each monomeric unit is derived from a single compound such as hexamethylene diamine, adipic acid or caprolactam in the case of polyamides and terephthalic acid in the case of polyesters. Precondensates or monomeric salts thus contain at least two monomeric units.

Some salts of the above-mentioned triamino-triazole compounds having the following properties:

Bis-3,5-(ω-aminopropyl)-4-aminotriazole-adipate: colorless crystalline powder from ethanol; melting point of 193–194° C. with splitting off of water.

Bis-3,5-(ω-aminopropyl)-4-aminotriazole-terephthalate: colorless crystalline powder from ethanol; melting point of 249–252° C. with splitting off of water.

Bis-3,5-(ω-aminopentyl)-4-aminotriazole-adipate: colorless needles from ethanol; melting point of 176–177° C. with splitting off of water.

Bis-3,5-(ω-aminopentyl)-4-aminotriazole-terephthalate:

colorless crystalline powder from water-ethanol; melting point 269–270° C. with splitting off of water.

Bis-3,5-(ω-aminopentyl)-4-aminotriazole-oxalate: colorless needles from ethanol; melting point of 165–180° C. with splitting off of water.

Bis - 3,5-(4-aminocyclohexyl)-4-aminotriazole-adipate: colorless glassy mass which can be triturated to a fine powder without defined melting point.

The method of producing the modified polycondensates is explained in detail with the aid of the following examples.

(In the examples, the molecular weight of the polymers is characterized by the Staudinger index $Z_\eta$ of solution viscosity. The $Z_\eta$ values are measured in 82.5% formic acid at 20° C. in an Ostwald viscosimeter and extrapolated to zero concentration.)

Production of precondensates

*Example 4.*—5.08 g. bis-3,5-(ω-aminopentyl)-4-aminotriazole are dissolved together with 1.6 g. NaOH in 200 ml. of water. The solution is treated in a vessel with another solution of 4.06 g. of isophthalic acid dichloride in 200 ml. of methylene chloride, and the mixture is rapidly agitated for 2 minutes at 5000 r.p.m. The polymer precipitating in solid form is drawn off, treated with water and dried. The $Z_\eta$ value of the product is $2.16 \times 10^{-2}$; the melting point is about 150–155° C.

*Example 5.*—In a vessel having a high-speed agitator, a solution of 2.06 g. of adipic acid dichloride in 200 ml. of ethylene chloride is treated with a solution of 2.86 g. bis-3,5-(ω-aminopentyl)-4-aminotriazole and 0.82 g. of NaOH in 30 ml. of water, and the mixture is agitated for 2 minutes at 5000 r.p.m. The colorless polymer, at first somewhat sticky, is agitated for several hours with water, drawn off and dried in a vacuum. The $Z_\eta$ value of the product is $2.40 \times 10^{-2}$; the melting point is 190–195° C.; the product is partly soluble in boiling water.

*Example 6.*—A solution of 9.80 g. of oxalic acid diethyl ester in 50 ml. of ethanol is mixed with a solution of 13.29 g. bis-3,5-(ω-aminopropyl)-4-aminotriazole. The resulting mixture is well agitated for about 15 minutes until the temperature of the reaction mixture again falls. After several hours the product is drawn off, rewashed and dried. The $Z_\eta$ value of the product is $1.50 \times 10^{-2}$; the melting point is about 250–255° C.; the product is soluble in hot water.

Production of modified condensates

*Example 7.*—2830 g. ε-caprolactam are heated with a solution of the salt of bis-3,5-(ω-aminopentyl)-4-aminotriazole and adipic acid in 280 g. of water under exclusion of air in a 10-liter autoclave, at first for 1 hour under a steam pressure of its own of 18 atmospheres (gauge) and then, after gradual release to normal pressure, for a total of 3.5 hours up to 270° C. The condensate is drawn off as a filament, cut up and extracted by boiling for several hours with water. Extract content 10%; melting point 216–218° C.; $Z_\eta \times 10^2 = 8.30$ (after extraction); soluble in the usual polyamide solvents.

*Example 8.*—22.6 g. ε-caprolactam are polymerized with the addition of 0.85 g. of the salt of bis-3,5-(4-aminocyclohexyl)-4-amino-triazole and adipic acid in a closed glass tube under nitrogen vacuum for 50 hours at 220° C. while shaking. The colorless condensate has an extract content of 8.0%. Melting point 215–217° C.; $Z_\eta \times 10^2 = 6.60$ (after extraction); soluble in the usual polyamide solvents.

*Example 9.*—Under the same conditions as described in Example 7, but without the addition of the triaminotriazole compound, a control condensate was produced. Extract content 10% melting point 216–218° C.; $Z_\eta \times 10^2 = 7.85$ (after extraction).

*Example 10.*—2500 g. of extracted cuttings of poly-ε-caprolactam produced according to Example 9 were intimately mixed with a solution of 28 g. bis-3,5-(ω-aminopentyl)-4-amino-triazole in 50 ml. of water and dried for 24 hours in a tumbler drier at 95° and 0.5 Torr under a protective gas and thereupon spun into fibrous filaments.

Properties of the spun polycondensates

In Table 1, several condensates provided with additives according to the invention are compared with a control condensate which contains no additive.

TABLE 1.—COMPARISON OF TEXTILE DATA

| Ex. | Additives | $Z_\eta \times 10^2$ | Denier | Stretch ratio | Strength | Breaking stretch, percent |
|---|---|---|---|---|---|---|
| 9 | None | 9.05 | 30/9 | 1:3.12 | 33.2 | 24.9 |
| 7 | + | 9.72 | 30/9 | 1.3.12 | 33.2 | 25.3 |
| 10 | + | 9.91 | 30/9 | 1.3.12 | 31.8 | 27.1 |

In Table 2, the dyeability of modified polycondensates produced according to the invention is compared with the dyeability of the control condensate according to Example 9. In each case, 3.5 g. of a fabric of filaments having a denier of 30/9 were dyed in a 1% dyestuff solution until the bath was exhausted. For the appraisal of the dyeability, the remission degrees were determined. (Measurement was carried out with "Elrepho" apparatus, filter R 42.)

TABLE 2.—COMPARISON OF DYEABILITY BY THE DEGREE OF REMISSION

| Dyestuff | Example No. 4 (1 mol. percent additive condensed-in) | | Example No. 7 (0.5 mol. percent additive panned-on) | |
|---|---|---|---|---|
| | Modified | Control | Modified | Control |
| Anthralan blue B | 19.6 | 24.1 | 20.7 | 23.5 |
| Perliton blue B | 26.7 | 29.8 | 27.3 | 29.1 |
| Cibalan blue B L | 9.5 | 11.9 | 9.9 | 11.4 |

The triamino-triazoles produced in accordance with the invention are quite distinct in their properties by comparison with the corresponding monoamino-triazoles, because the triamino-triazoles have two highly basic amino groups capable of entering into many well-known reactions involving one or two amino groups on a heterocyclic ring. When prepared by the method of this invention, the triamino-triazoles can be easily obtained from simple raw materials and in good yields of high purity suitable for further use in the manner indicated hereinabove.

APPENDIX

*Example 11.*—Production of bis-3,5-(4-aminocyclohexyl)-4-aminotriazole: 4.0 g. of hexahydro-p-aminobenzoic acid-lactam are heated with 7.0 g. of freshly distilled 100% hydrazine hydrate in a bomb tube under a nitrogen atmosphere for 6 hours at 210° C. After distilling off the volatile components from the reaction product on a boiling water bath under the reduced pressure of a water jet vacuum, there remains after cooling a colorless solid glassy mass. The powdered mass is extracted for several times with ether and once with cyclohexane for cleaning. The product is soluble in water and represents the mixture of the cis-trans-isomers. The yield is 85% of the theoretical amount.

The invention is hereby claimed as follows:

1. A process for the production of a bis-3,5-(ω-aminoalkyl)-4-aminotriazole which comprises reacting a lactam with hydrazine at a temperature between about 150° C. and 250° C. and in the presence of an inert gas.

2. A process as claimed in claim 1 wherein the reaction temperature is about 180° C. to 230° C.

3. A process as claimed in claim 1 wherein said hydrazine is introduced into the reaction as hydrazine hydrate.

4. A compound of the formula

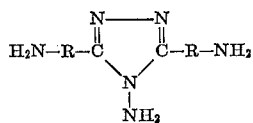

wherein R represents a member selected from the group consisting of $-C_nH_{2n}-$ and

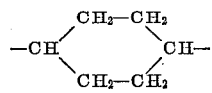

$n$ being an integer of from 3 to 7, inclusive.

5. A process as claimed in claim 1 wherein said reaction is carried out at a pressure of about 30 to 70 atmospheres.

6. A process as claimed in claim 1 wherein said lactam is reacted with a molar excess of said hydrazine.

7. Bis-3,5-(ω-aminopropyl)-4-aminotriazole.

8. Bis-3,5-(ω-aminopentyl)-4-aminotriazole.

9. Bis-3,5-(4-aminocyclohexyl)-4-aminotriazole.

References Cited by the Examiner

UNITED STATES PATENTS

| | | | |
|---|---|---|---|
| 2,570,180 | 10/1951 | Allewelt | 260—78 |
| 2,571,251 | 10/1951 | Jones | 260—78 |
| 2,825,715 | 3/1958 | D'Alelio | 260—78 |
| 2,825,716 | 3/1958 | D'Alelio | 260—78 |
| 2,834,757 | 5/1958 | D'Alelio | 260—78 |
| 2,875,209 | 2/1959 | Niese et al. | 260—308 |
| 2,987,520 | 6/1961 | Sickman | 260—308 |

FOREIGN PATENTS 379,221  7/1962  Japan.

OTHER REFERENCES

Taniyama et al., Kogyo Kagaku Zasshi, Vol. 64, pages A99 and 1626–8 (1961).

NICHOLAS S. RIZZO, *Primary Examiner.*

J. R. LIBERMAN, *Examiner.*